June 30, 1942.  W. T. DEAN  2,287,785
REGENERATIVE FURNACE
Filed July 31, 1940

Inventor:
WILLIAM T. DEAN,
by John E. Jackson
his Attorney.

Patented June 30, 1942

2,287,785

UNITED STATES PATENT OFFICE 2,287,785

REGENERATIVE FURNACE

William T. Dean, Gary, Ind.

Application July 31, 1940, Serial No. 348,871

5 Claims. (Cl. 263—15)

This invention relates to improvements in apparatus for firing regenerative soaking pit furnaces and the like, this application being a continuation-in-part of my prior application, Serial No. 208,710, filed May 18, 1938.

My invention contemplates providing a furnace of the character stated capable of using both rich and lean fuels without injurious effects of direct localized flame impingement of high temperature flames upon the ingots or steel being heated.

It is a further object of my invention to provide a furnace of the character stated wherein the entrained solids are separated from the products of combustion passing out of the heating zone whereby to prevent clogging of the checkers of the furnace.

A still further object is to provide a furnace having rich and lean fuel combustion chambers so related as to provide for the improved combustion and flame characteristics as above stated.

Figure 1:
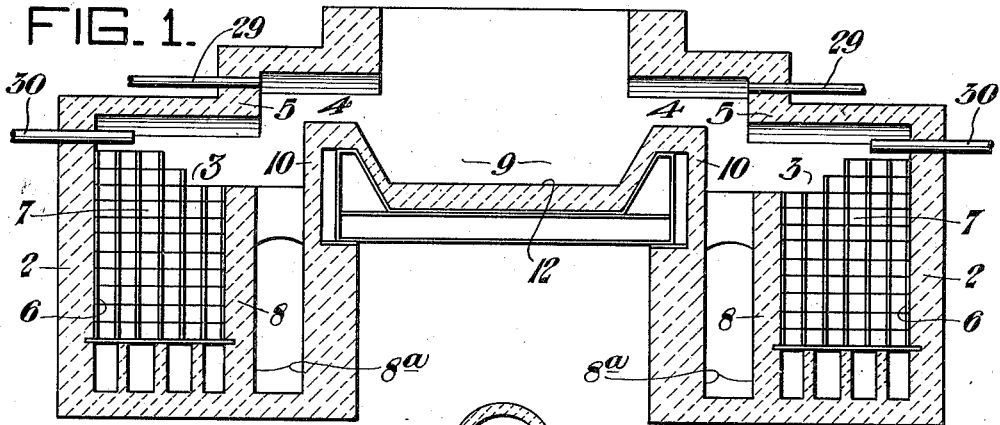
Figure 2:
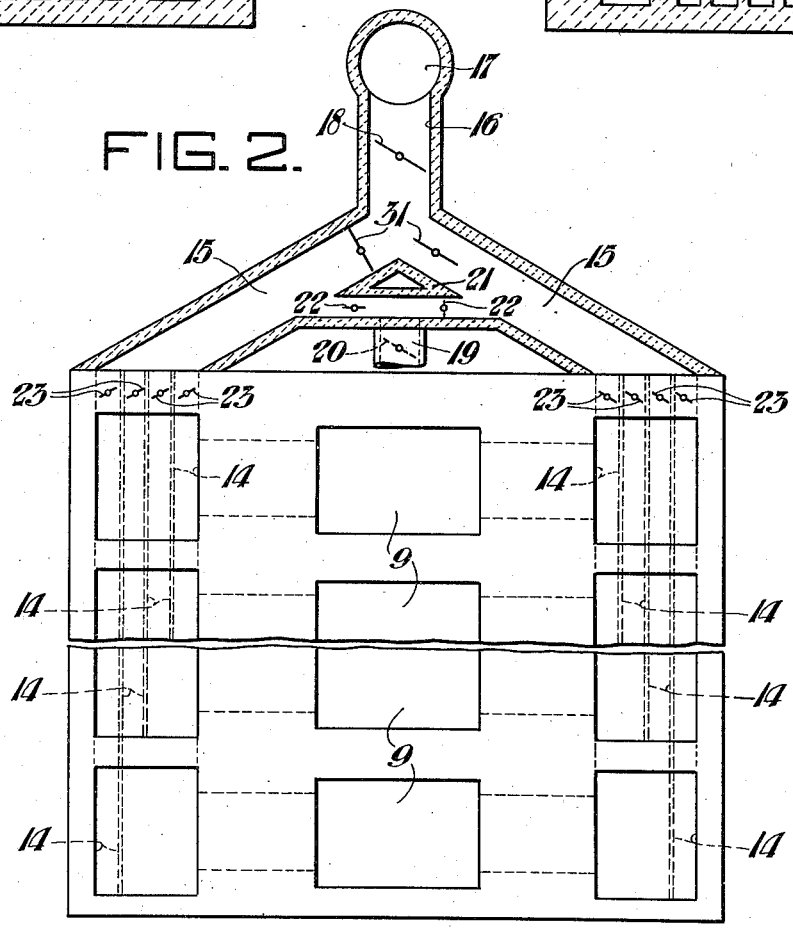

Additional objects and advantages will become apparent from the following description taken in connection with the accompanying drawing, wherein:

Fig. 1 is a sectional elevation of the furnace constructed under the present invention; and Fig. 2 is a diagrammatic plan of the showing of Fig. 1.

In the drawing, the furnace 2 under the present invention includes firing zones each comprising a lower lean fuel combustion chamber 3 and an upper rich fuel combustion chamber 4, with the wall of said furnace so constructed and arranged as to provide deflecting walls 5 intermediate each rich and lean combustion chamber, said walls 5 preferably being vertical for purposes hereinafter described. Located at opposite sides of the furnace are regenerator chambers 6 lined with checker-brick or tile indicated at 7. Separated from said regenerator chambers 6 by walls 8 are hot slag chambers or pockets 8ª.

Positioned centrally of said furnace and between the regenerator chambers 6 are soaking pits 9 within which the steel to be treated is positioned. The bridge walls 10, forming the ends of said soaking pits, extend upwardly beyond the hearth or base 12 of said pits to an approximate level with the downwardly projecting vertical deflecting walls 5, but spaced therefrom to provide vertical passages for gases. This construction provides deflecting vertical walls 5 against which outflowing gases impinge and deflecting vertical walls 10 against which inflowing gases impinge, thereby assisting in precipitating solids from such gases.

Extending from each regenerator chamber, as shown in dotted lines in Fig. 2, is a flue 14 connecting with a branch 15 of the main flue 16 leading to a stack 17. Positioned within the main flue 16 is a main damper 18 to regulate the amount of draft desired for said furnace. Air is admitted through the pipe 19, or, if desired, such air may be induced by stack action. A damper 20 is positioned within the air inlet pipe 19 to control, as desired, the amount of air supplied. Positioned adjacent the air inlet pipe 19 is a deflector 21 for directing the air to either regenerator chamber, as desired, while reversing dampers 22 are arranged adjacent the air outlet to admit the directed air supply to that side of the regenerators not connected to the stack 17. Dampers 31 in branch flues 15 are regulated to connect either regenerator to the stack 17 when the dampers connecting the opposite regenerator to the stack are closed. Individual dampers 23 are positioned within the flues leading to each regenerator chamber to regulate the amount of air supplied to the respective pits 9 or to limit the amount of draft thereto.

In designing new pits or furnaces, space limitations may not prevent ample allowance for regenerative chambers but, in order to convert existing furnaces to the use of lean gases requiring approximately double the flue area with increased heating surface, space is not always available for the larger regenerators required by the present designs for regenerator checkers.

Therefore, the present invention provides apparatus for the burning of either rich or lean gases, or combinations of the two, by giving to each fuel the combustion space and time elements needed for the best results. Separate burners are provided for the rich and lean fuel combustion chambers, 29 designating the burners for rich fuels and 30 the burners for lean fuels. Upon reversing the flow, the products of combustion leave the pit horizontally and are deflected downwardly by the deflecting wall 5 through the passage between the adjacent rich and lean combustion chambers, thence again horizontally to the regenerator therebeneath. This change in direction is accompanied by a change in velocity of the gases which tends to throw down practically all of the entrained solids into said hot slag pocket or chamber 8ª beneath the deflecting passage. The hot gases then enter the regenerator flues substantially free from solids or slag, greatly increasing the life of the upper courses of checkers, at present so susceptible to slag damage.

In operation, a lean fuel, such as blast furnace gas is supplied to the burners 30 at the side of the furnace being fired, said gas mixing with the incoming air from the pre-heated regenerator chamber 6 therebelow to effect substantially complete combustion of said gas. The impingement of the burning gases upon the bridge wall 10 aids combustion through aiding the mixture of gas and air, and effects a separation of the entrained solids from the gas, which solids lose their velocity and fall into the slag pocket 8a below said wall.

The burning blast furnace or lean gas is also deflected upwardly by the wall 10, between said wall and the deflection wall 5, and engages the stream of rich gas from the burner 29 spaced thereabove. At the zone of engagement of the said gases, the temperature of the combusted mixture of air and lean gas is high in relation to that of the rich gases, whereupon the following action takes place.

Due to the utilization of the incoming air for burning the lean gas, there exists a shortage of air for the combustion of the rich gas which readily permits a partial decomposition of the incompletely combusted rich gas.

The high temperature of the lean gas and air combustion cracks the incompletely combusted rich coke oven or other high hydrocarbon gas, liberating free carbon from the latter, whereupon the heating flame reaching the hearth and the ingots is rendered highly luminous and soft, and has an increased area of spread or dispersion over the hearth.

The resulting flame will not injure the steel of the ingots as the same does not have the high oxidizing property nor the high temperature heretofore attendant upon the use of such gases in firing soaking pit furnaces.

I have found that by firing the lean and rich gases in the manner herewith set forth, I am enabled to successfully utilize blast furnace gas without the necessity of prolonged and expensive cleaning operations as heretofore deemed necessary before attempting to burn the gas.

While I have shown and described one specific embodiment of the invention, it will be understood that I do not wish to be limited exactly thereto, since various modifications may be made without departing from the scope of the invention, as defined in the appended claims.

I claim:

1. In a regenerative furnace, the combination with a hearth, of regenerator chambers spaced therefrom, slag pockets between each chamber and the hearth, said furnace having combustion zones disposed above the pockets and regenerator chambers each comprising a rich combustion chamber adjacent the hearth and a lean fuel combustion chamber above a regenerator chamber, bridge walls adjacent the hearth and deflecting walls above the regenerator chambers, said walls defining vertical passages between the rich and lean fuel firing zones, said passages being disposed over the slag pockets, whereby entrained solids are precipitated into a pocket upon a flow of hot gases from the hearth to a regenerator chamber.

2. In a regenerative furnace, the combination with a hearth, of regenerator chambers spaced therefrom, slag pockets between each chamber and the hearth, said furnace having combustion zones each comprising a lean fuel combustion chamber directly above a regenerator chamber and a rich fuel combustion chamber adjacent the hearth in spaced relation to the lean fuel combustion chamber, bridge walls adjacent the hearth, vertical deflecting walls above the regenerators and lean fuel combustion chambers, said walls defining vertical passages between the rich and lean fuel combustion chambers disposed over the slag pockets, separate burners for the rich and lean fuel combustion chambers, the burners for the lean fuel combustion chambers being disposed to direct the flames thereof against the said bridge walls.

3. In a regenerative furnace, the combination with a hearth, of regenerator chambers spaced therefrom, slag pockets between each chamber and the hearth, said furnace having firing zones each comprising a lean fuel combustion chamber disposed horizontally over a regenerator chamber and a rich fuel combustion chamber disposed horizontally above the hearth and lean fuel combustion chamber, bridge walls adjacent the hearth and vertical deflecting walls above the lean fuel combustion chambers, said walls defining vertical passages for deflecting passage of gases between said rich and lean combustion chambers, said passages being disposed over the slag pockets, whereby entrained solids are precipitated into a pocket upon a flow of hot gases from the hearth to a regenerator chamber.

4. In a regenerative furnace, the combination with a hearth, of regenerator chambers spaced therefrom, slag pockets between each chamber and the hearth, said furnace having firing zones each comprising a lean fuel combustion chamber disposed horizontally over a regenerator chamber and a rich fuel combustion chamber disposed horizontally above the hearth and lean fuel combustion chamber, vertical deflecting walls over the lean fuel combustion chambers, bridge walls adjacent the hearth extending upwardly beyond said hearth to the approximate level of said deflecting walls, said bridge and deflecting walls defining passages for deflecting passage of gases between said rich and lean combustion chambers, said passages being disposed over the slag pockets, whereby entrained solids are precipitated into a pocket upon a flow of hot gases from the hearth to a regenerator chamber.

5. In a regenerative furnace, the combination with a hearth, of regenerative chambers spaced therefrom, slag pockets between said chamber and the hearth, a lean fuel combustion chamber above each regenerator in communication with its respective regenerator, a rich fuel combustion chamber above each lean fuel combustion chamber, a vertical deflecting wall over each lean combustion chamber, a bridge wall between the hearth and each slag pocket extending upwardly beyond the hearth to the approximate level of the deflecting walls, said bridge and deflecting walls being spaced to provide passages for delivery of the combusted lean gases to said rich combustion chambers during firing of the furnace, and said passages being disposed over the slag pockets whereby entrained solids are precipitated into said pockets upon reverse flow of hot gases from the hearth through said passages to the regenerators.

WILLIAM T. DEAN.